(12) United States Patent
Wiepen

(10) Patent No.: US 7,608,360 B2
(45) Date of Patent: Oct. 27, 2009

(54) RECHARGEABLE BATTERY AND METHOD FOR ITS PRODUCTION

(75) Inventor: Rolf Wiepen, Schwerte (DE)

(73) Assignee: Johnson Controls Hybrid and Recycling GmbH, Hannover (DE)

( * ) Notice: Subject to any disclaimer, the term of this patent is extended or adjusted under 35 U.S.C. 154(b) by 690 days.

(21) Appl. No.: 11/019,085

(22) Filed: Dec. 21, 2004

(65) Prior Publication Data

US 2005/0153200 A1 Jul. 14, 2005

(30) Foreign Application Priority Data

Jan. 14, 2004 (DE) .................. 10 2004 001 876

(51) Int. Cl.
*H01M 2/24* (2006.01)
*H01M 2/26* (2006.01)
*H01M 10/02* (2006.01)

(52) U.S. Cl. ................ 429/211; 429/160; 429/161

(58) Field of Classification Search ......... 429/160–161, 429/178, 181, 211
See application file for complete search history.

(56) References Cited

U.S. PATENT DOCUMENTS

| | | | | |
|---|---|---|---|---|
| 1,450,889 A | * | 4/1923 | Laing et al. | 429/49 |
| 2,470,163 A | * | 5/1949 | Gray | 429/66 |
| 3,844,841 A | | 10/1974 | Baker | |
| 4,117,969 A | * | 10/1978 | Fukuba | 228/140 |
| 4,646,430 A | * | 3/1987 | Clarke | 29/623.1 |
| 5,230,967 A | * | 7/1993 | Radmall | 429/152 |
| 5,766,798 A | * | 6/1998 | Bechtold et al. | 429/211 |

FOREIGN PATENT DOCUMENTS

| | | | |
|---|---|---|---|
| DE | 19532896 A1 | * | 3/1997 |
| DE | 698 00 524 T2 | | 3/2001 |
| JP | 56167267 A | * | 12/1981 |

* cited by examiner

*Primary Examiner*—Gregg Cantelmo
(74) *Attorney, Agent, or Firm*—Foley & Lardner LLP

(57) ABSTRACT

The present invention relates to a rechargeable battery having a plurality of cells each having a plurality of positive and negative electrode plates, the positive and negative electrode plates electrically isolated from one another by separators and having output lugs arranged alternately alongside one another. The rechargeable battery also includes a first output lug bundle comprising the output lugs of the positive electrode plates of a first cell electrically connected together and a second output lug bundle comprising the output lugs of the negative electrode plates of the first cell electrically connected together. The first output lug bundle and the second output lug bundle each comprise a recess for holding a pole output conductor, the pole output conductor having a clamping shoe with two clamping plates which can be moved relative to one another by means of a clamping screw in which case the clamping screw can be inserted into the recess in the output lug bundle.

20 Claims, 5 Drawing Sheets

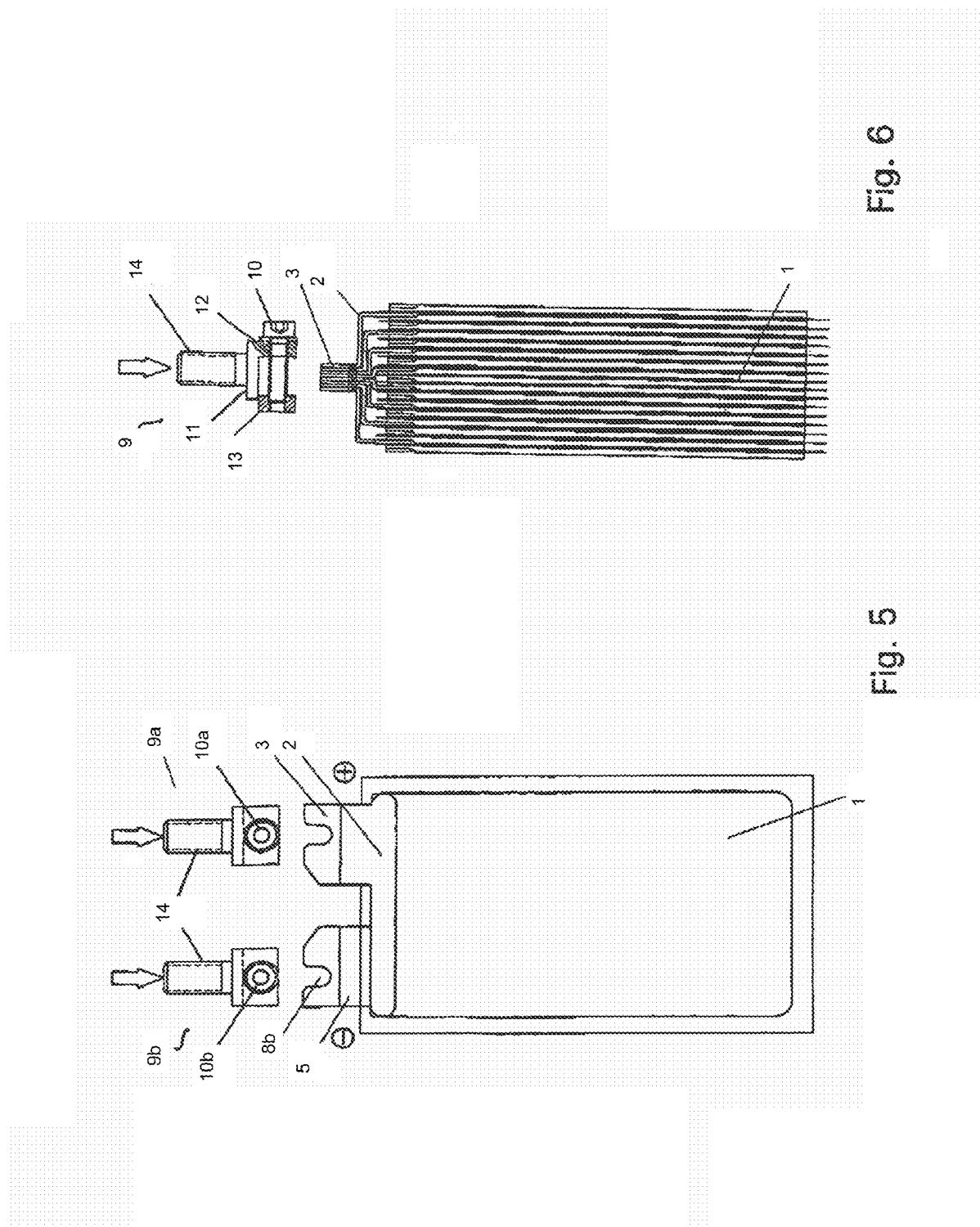

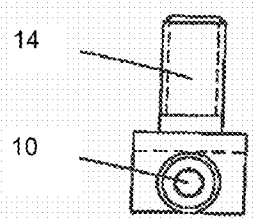
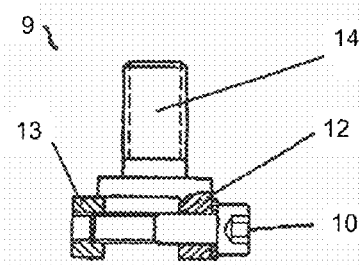
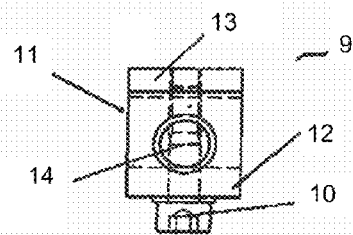
Fig. 7a
Fig. 7b
Fig. 7c
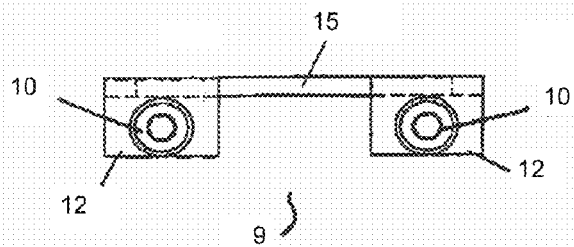
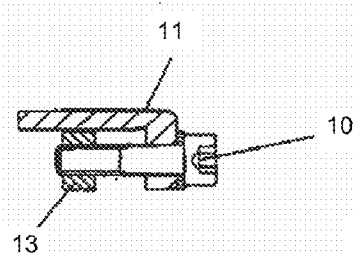
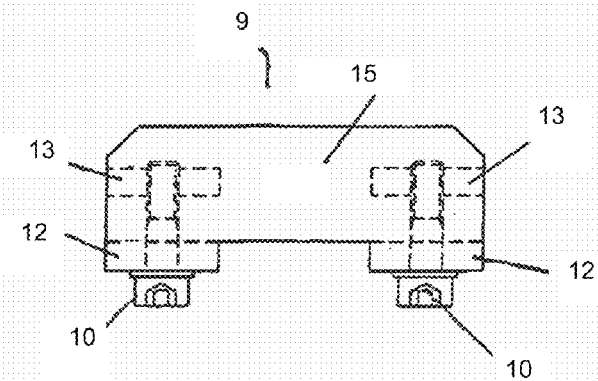
Fig. 8a
Fig. 8b
Fig. 8c

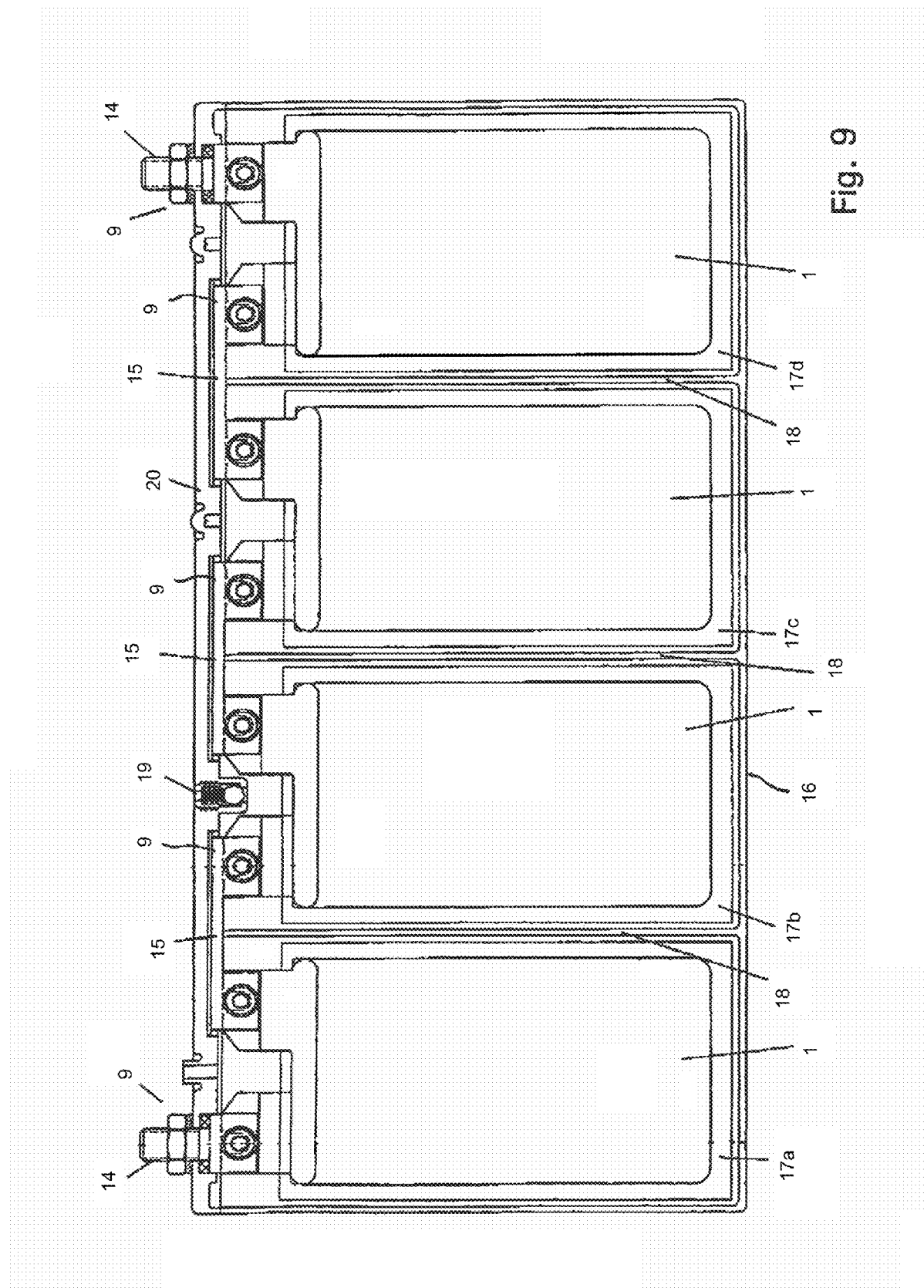

RECHARGEABLE BATTERY AND METHOD FOR ITS PRODUCTION

CROSS-REFERENCE TO RELATED PATENT APPLICATIONS

German Priority Application DE 10 2004 001 876.6, filed Jan. 14, 2004 including the specification, drawings, claims and abstract, is incorporated herein by reference in its entirety.

BACKGROUND

The present invention relates to a rechargeable battery and a method for producing such a battery.

The requirements for the electrical charging and discharge performance for rechargeable batteries for vehicle applications are particularly stringent. This is particularly true for modern hybrid vehicles, in which large discharge currents are required, for example for acceleration, from relatively small energy storage batteries. Since the primary aim of hybrid vehicles is to improve economy by reducing the fuel consumption, a high-efficiency battery system is a fundamental precondition. The energy losses between the energy which can be drawn and the energy applied during charging must for this reason be kept as low as possible.

One of the major loss factors in rechargeable battery assemblies is the connection between the electrode packs in the individual cells and the pole bushings, and their connections to the intermediate cell connectors. A connection with high electrical conductivity and good mechanical robustness which is stable in the long term is necessary in order to ensure high energy efficiency of the battery system in the long term.

U.S. Pat. No. 3,844,841 and DE 698 00 524 T2 have disclosed rechargeable batteries in which the individual electrodes are provided with output lugs on their upper edge which have a circular hole in the region of their largest area extent. During assembly of the electrochemical cell (for example, nickel cadmium or nickel iron), electrodes of positive and negative polarity are stacked alternately one above the other, electrically isolated from one another by means of a fibrous separator. In this case, the positive output lugs and the negative output lugs point in opposite directions. The lugs and therefore all of the electrodes as well are mechanically passed through a positive and a negative pole link which, in the form of cylindrical bolts, pass through all the holes in the output lugs of the same polarity. These cylindrical bolts are threaded at their end. The output lugs are fixed by fitting a threaded nut to the pole end.

In order to allow the output lugs to be bundled and the holes in the output lugs to be aligned such that they are flush with one another, the output lugs must be mechanically angled, and must have different lengths, before being stacked. This necessitates a large number of different electrode types, whose manufacture is complex and expensive as a result of the handling of a large number of mechanically different parts.

For electrode arrangements with a relatively small number of individual electrodes, it is also known for the spaces between the output lugs to be filled by annular intermediate disks, in order to create a mechanically robust collector structure which is highly electrically conductive. The output lugs of the individual electrodes are electrically conductively firmly connected together, together with the intermediate disks, by tightening the closure nuts. A pole bolt is arranged approximately at the geometric center of the pole link, instead of an intermediate disk, and its lower end has a central opening in the same way as the intermediate disks. The pole bolt projects at right angles beyond the output lug bundle out of the electrode pack, and ensures that the electric current is output to the exterior from the cell.

The pole bolt is passed out of the housing to the exterior, for electrical purposes, in a gas-tight form by means of an arrangement comprising insulating, sealing and screw elements, so that no gas from the interior of the cell can penetrate to the exterior, and no gas from the exterior can penetrate into the interior of the cell via the bushing.

The electrical connection of the cells in a battery assembly to one another is made by means of cell connectors which are mechanically fitted in that part of the pole bolt which is located outside the cell. Alternatively, embodiments are also known, for example from the cited U.S. Pat. No. 3,844,841 and DE 698 00 524 T2, in which a pole output conductor, which makes electrical contact with an output lug bundle, is passed through the separating wall between adjacent cells.

It would be advantageous to provide an improved rechargeable battery having two or more cells which can be produced more easily and at a lower cost while nevertheless ensuring that the output lug bundles in the cell assembly are connected in a manner which is stable in the long term and is electrically highly conductive.

SUMMARY

The present invention relates to a rechargeable battery having a plurality of cells each having a plurality of positive and negative electrode plates, the positive and negative electrode plates electrically isolated from one another by separators and having output lugs arranged alternately alongside one another. The rechargeable battery also includes a first output lug bundle comprising the output lugs of the positive electrode plates of a first cell electrically connected together and a second output lug bundle comprising the output lugs of the negative electrode plates of the first cell electrically connected together. The first output lug bundle and the second output lug bundle each comprise a recess for holding a pole output conductor, the pole output conductor having a clamping shoe with two clamping plates which can be moved relative to one another by means of a clamping screw in which case the clamping screw can be inserted into the recess in the output lug bundle.

The present invention also relates to a method for production of a rechargeable battery that includes providing alternating positive and negative electrode plates alongside one another, with the positive and negative electrode plates being isolated from one another by a separator to form one electrode plate stack for each cell. The method also includes tilting identical output lugs which are integrally connected to the electrode plates to form output lug bundles for the positive electrode plates of a cell and for the negative electrode plates of a cell. The method further includes cutting the output lug bundles to length such that each output lug bundle is provided with a flat connecting surface and providing recesses in the output lug bundles. The method further includes inserting a pole output conductor onto an associated output lug bundle with a clamping shoe which has two clamping plates which can be moved relative to one another by means of a clamping screw, and pressing the clamping plates against the associated output lug bundle by means of the clamping screw.

BRIEF DESCRIPTION OF THE DRAWINGS

The invention will be explained in more detail in the following text with reference to the attached drawings, in which:

FIG. 5 shows a side view of a cell illustrating a step of fitting pole output conductors to the holding contour of the output lug bundles;

FIG. 6 shows a cross-sectional view of the cell shown in FIG. 5;

FIGS. 7a to 7c show a side view, plan view and cross-sectional view of the pole output conductor shown in FIGS. 5 and 6;

FIGS. 8a to 8c show a side view, a plan view and a cross-sectional view of a pole output conductor in the form of a cell connector; and FIG. 9 shows a side view of a cut-open rechargeable battery with four cells, which are connected to one another by means of a cell connector as shown in FIG. 8.

DETAILED DESCRIPTION OF EXEMPLARY EMBODIMENTS

Figure 1:
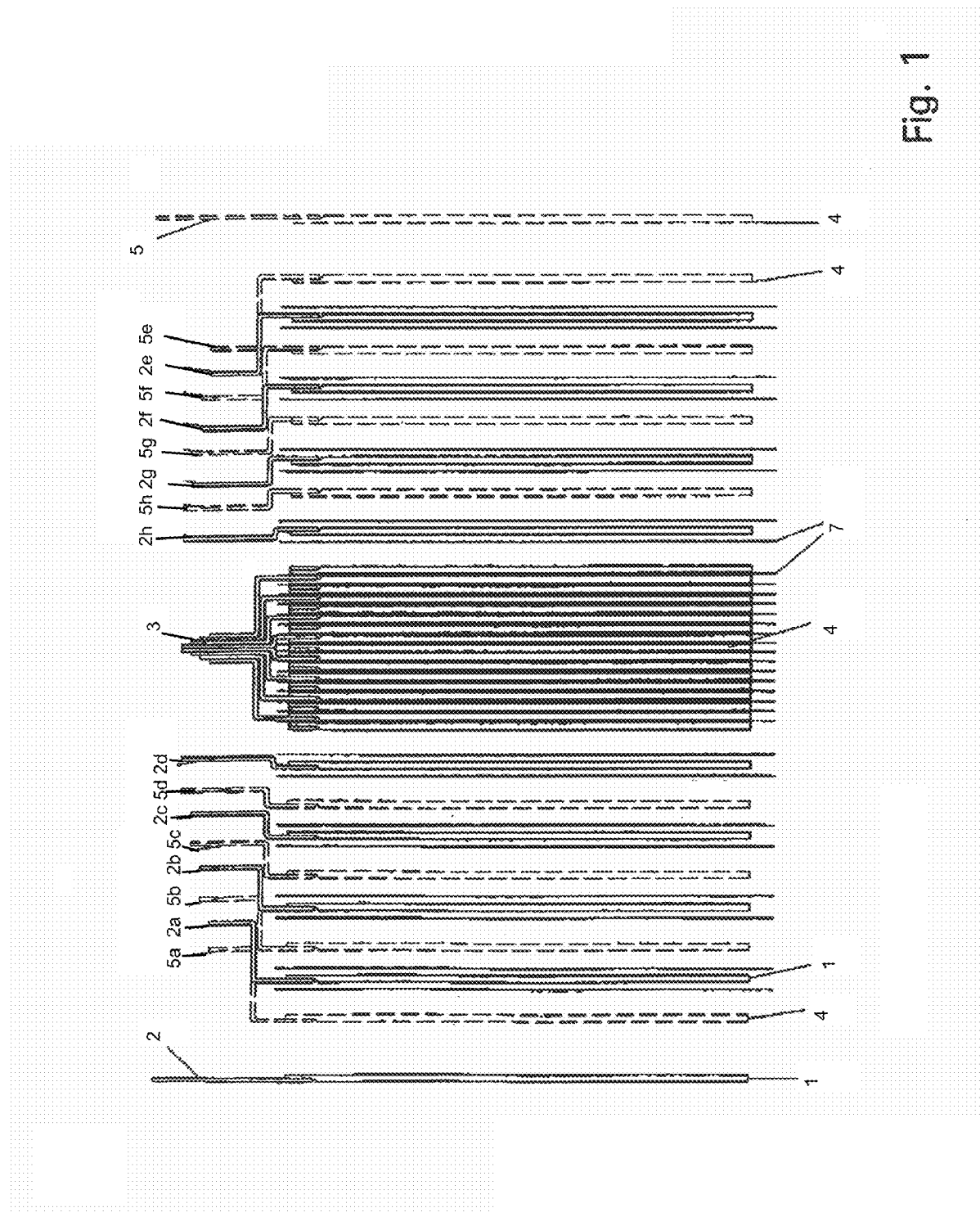
FIG. 1 shows a cross-sectional view of an electrode plate stack for a cell with angled output lugs, as well as an exploded view.

According to an exemplary embodiment, a rechargeable battery includes two or more cells which each have a large number of positive and negative electrode plates having output lugs which are arranged alternately alongside one another and which are electrically isolated from one another by separators having output lugs, with the bundled output lugs of the positive electrode plate of one cell being electrically connected to one another and being provided with a pole output conductor, and the bundled output lugs of the negative electrode plates of a cell being electrically connected to one another and being provided with a pole output conductor.

According to an exemplary embodiment, a method for the production of a rechargeable battery of this kind includes the following steps: (a) alternating arrangement of positive and negative electrode plates alongside one another, in each case isolated from one another by a separator in order to form one electrode plate stack for each cell, and (b) tilting of the identical output lugs, which are integrally connected to the electrode plates, in order to form output lug bundles for the positive electrode plates of a cell and for the negative electrode plates of a cell.

According to an exemplary embodiment, the bundled output lugs have a slot-like recess with a U-shaped contour for holding a pole output conductor which can be fitted to the output lug bundle, and the pole output conductor has a clamping shoe with two clamping plates which can be moved relative to one another by means of a clamping screw in which case the clamping screw can be inserted into the U-shaped contour of the slot-like recess in the output lug bundle.

The slot-like recess with the U-shaped contour makes it simpler to align the output lugs of an output lug bundle, and the pole output conductor, which is in the form of a clamping shoe, can easily be fitted to the holding contour such that the clamping screw slides into the U-shaped contour. The clamping shoe is then pressed against the output lug bundle by tightening the clamping plates with respect to one another by means of the clamping screw.

According to an exemplary embodiment, a method of producing a rechargeable battery includes the following steps:

(a) the output lug bundles are cut to length such that each output lug bundle is provided with a flat connecting surface; (b) slot-like recesses with a U-shaped contour are introduced into the output lug bundles; (c) a pole output conductor is inserted onto an associated output lug bundle with a clamping shoe which has two clamping plates which can be moved relative to one another by means of a clamping screw; and (d) the clamping plates are pressed against the output lug bundle by means of the clamping screw.

The method clearly allows electrode plates with identical output lugs to be stacked, with the output lugs being angled after the stacking process in order to form an output lug bundle, and then being cut to length. After this, the U-shaped contour is incorporated in the output lug bundle (which has been cut to length), for example by laser cutting, so that there is no need to align holes. The clamping shoe of a pole output conductor can then easily be fitted to the output lug bundle, with the clamping screw being slid into the U-shaped contour and the clamping plates being pressed against the output lug bundle by means of the clamping screw.

In one exemplary embodiment, the pole output conductor has an angled contact plate, with a first limb of the contact plate forming a clamping plate and having a hole for holding the clamping screw. The other, second limb is integrally connected to a pole bolt which projects at right angles from the other limb. According to another exemplary embodiment, the second limb can be integrally connected to a cell connector element which extends transversely away from the second limb and is in turn connected to the angled contact plate of a second pole output conductor for an associated further cell.

For this situation, in which the pole output conductor is in the form of a cell connector for cells associated with two electrode plate groups, the pole output conductor preferably has one angled contact plate for each cell, which has first limbs (which forms a clamping plate) with a hole for holding the clamping screw, and a second limb which extends at right angles to the first limb. The second limbs of the two contact plates of a pole output conductor are formed integrally at the side with a cell connector element which connects the two limbs.

FIG. 1 shows positive electrode plates 1 with output lugs 2 which are integrally formed on them in an electrically conductive manner. The output lugs 2 are angled such that the output lugs 2a to 2h of the stacked positive electrode plates 1 of one cell are combined to form an output lug bundle 3, and are electrically conductively adjacent to one another there.

The negative electrode plates 4 of one cell are provided in a corresponding manner with output lugs 5 which are integrally formed on them in an electrically conductive manner. These output lugs 5a to 5h are combined to form an output lug bundle 6 (FIG. 2).

Figure 2:
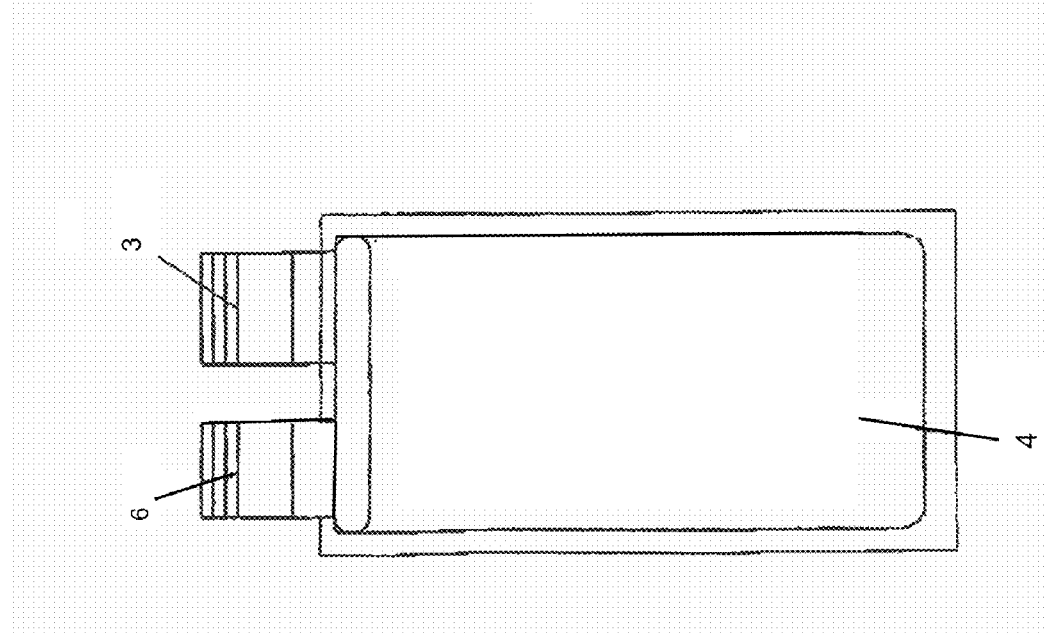
FIG. 2 shows a side view of the electrode plate stack shown in FIG. 1 with output lugs pointing in opposite directions of each of the bundled positive and negative electrode plates.

As can be seen from the side view of a cell in FIG. 2, the output lug bundle 3 for the positive electrode plates 1 is aligned in the opposite direction to the output lug bundle 6 for the negative electrode plates 4, so that contact can be made with the output lug bundles 3, 6 independently of one another.

FIG. 1 also shows that the positive electrode plates 1 and the negative electrode plates 4, which are located alongside one another, are separated from one another by means of fibrous separators 7.

Figure 3:
FIG. 3 shows a section view of an electrode plate stack for a cell with output lug bundles cut to length.

Once the step of inclination of the output lugs 2, 5 and their combination to form output lug bundles 3, 6 has been carried out, the step of cutting the output lug bundles 3, 6 to length which can be seen from the section view in FIG. 3 is carried out in such a way that each output lug bundle 3, 6 is provided with a flat connecting surface.

Figure 4:
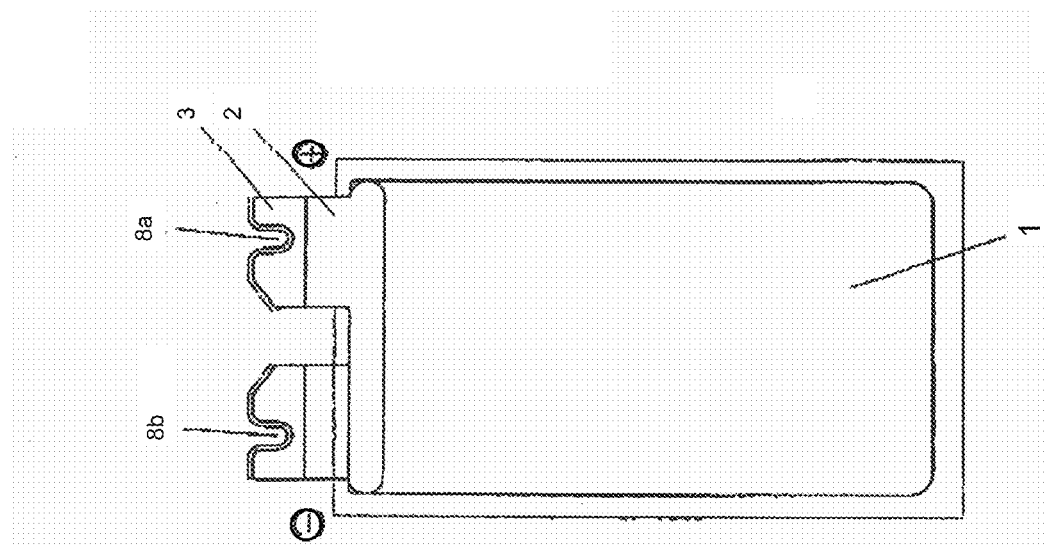
FIG. 4 shows a side view of a cell with holding contours on the output lug bundles.

As can be seen from FIG. 4, once the output lug bundles 3, 6 have been cut to length, a slot-like recess with a U-shaped contour 8a, 8b is introduced into the output lug bundles 3, 6, for example by laser cutting.

FIG. 5 shows a side view of a cell with the subsequent step of fitting pole output conductors 9a, 9b to the recess in the output lug bundles 3, 6 of the positive and negative electrode plate groups, with a clamping screw 10a, 10b for the pole output conductor 9a, 9b being slid into the U-shaped contour 8a, 8b of the associated output lug bundle 3, 6.

The cross-sectional view of FIG. 6 shows the design of the pole output conductors 9a, 9b with an angled, L-shaped contact plate 11. The first limb 12 of the contact plate 11 forms a clamping plate for making contact with an output lug bundle 3, 6, while the second limb is used to guide a clamping plate 13, which can be moved relative to the first limb 12 by means of the clamping screw 10. Once the pole output conductor 9 has been fitted to an output lug bundle 3, 6, the clamping shoe (which is formed from the angled contact plate 11 together with the first limb 12 and the clamping plate 13) can thus be pressed against the output lug bundle 3, 6 by rotation of the screw 10, thus ensuring a permanent, highly electrically conductive, electrical connection.

A pole bolt 14 projects at right angles in front of the second limb of the angled contact plate 11 in order to make external contact with the positive and negative electrode plate stacks. The pole bolt 14 can be passed in a liquid-tight and gas-tight manner through a cell housing by means of a suitable arrangement of insulating, sealing and screw elements.

FIGS. 7a to 7c respectively show a side view, a plan view and a cross-sectional view of a pole output conductor 9 in the embodiment with pole bolts 14. This clearly shows that the pole bolt 14 is formed integrally with the second limb of the angled contact plate 11, and projects upwards at right angles from it. As can also be seen, the clamping screw 10 which is passed through the first limb 12 extends parallel to the main extent direction of the L-shaped contact plate 11. The clamping plate 13 is screwed to the opposite end of the clamping screw 10 to the first limb 12 and can be pushed through the second limb of the contact plate 11, guided in the direction of the first limb 12.

FIGS. 8a to 8c show another embodiment of a pole output conductor 9 as a cell connector. The clamping shoe of the pole output conductor 9 is once again formed by the angled contact plate 11, the clamping screw 10 which is passed through the first limb 12, and the clamping plate 13. However, in this embodiment, two pole output conductors 9a, 9b are integrally and electrically conductively connected to one cell connector element 15. This means that the pole output conductors for two associated electrode plate stacks of different, preferably adjacent cells, are a common element.

FIG. 9 shows how the cells in a multicell rechargeable battery are connected in series by means of the pole output conductors 9, which are in the form of cell connectors, shown as a side view of a cut-open rechargeable battery 16 with four cells 17a, 17b, 17c and 17d. As can be seen, the pole output conductors 9 which are connected to the outer electrode plate groups have pole bolts 14 in order to make external electrical contact with the rechargeable battery 16. The positive and negative electrode plate groups of adjacent cells 17 are, in contrast, electrically conductively connected to one another by means of pole output conductors 9, which are in the form of cell connectors with cell connector elements 15 which extend between the cells 17 above the cell separating walls 18.

The rechargeable battery 16 may also, in a known manner, have a degassing valve 19 in the rechargeable battery cover 20.

It is important to note that the construction and arrangement of the rechargeable battery as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present inventions as expressed in the appended claims.

What is claimed is:

1. A rechargeable battery comprising:
   a plurality of cells each having a plurality of positive and negative electrode plates, the positive and negative electrode plates electrically isolated from one another by separators and having output lugs arranged alternately alongside one another;
   a first output lug bundle comprising the output lugs of the positive electrode plates of a first cell electrically connected together;
   a second output lug bundle comprising the output lugs of the negative electrode plates of the first cell electrically connected together;
   wherein the first output lug bundle and the second output lug bundle each comprise a recess for holding a respective pole output conductor, each of the pole output conductors comprising an angled contact plate comprising a first limb and a second limb extending substantially at a right angle to the first limb, the first limb forming a first clamping plate;
   wherein each of the pole output conductors further comprises a clamping screw and a second clamping plate at an end of the clamping screw opposite the first clamping plate such that the second clamping plate abuts a bottom of the second limb such that the second limb acts as a guide for the second clamping plate, in which case the clamping screw can be inserted into the recess in the output lug bundle.

2. The rechargeable battery of claim 1 wherein the first clamping plate comprises a hole for holding the clamping screw.

3. The rechargeable battery of claim 1 wherein the second limb is integrally connected to a pole bolt which projects substantially at a right angle from the second limb.

4. The rechargeable battery of claim 1 wherein the second limb is integrally connected to a cell connector element which extends transversely away from the second limb.

5. The rechargeable battery of claim 1 wherein the pole output conductor is in the form of a cell connector for cells which are associated with two electrode plate groups and each have an angled contact plate for each cell.

6. The rechargeable battery of claim 1 wherein the recess is a slot-like recess with a U-shaped contour.

7. The rechargeable battery of claim 1 wherein the first clamping plate and the second clamping plate form a clamping shoe wherein the first clamping plate and the second clamping plate move relative to one another by rotation of the clamping screw.

8. A rechargeable battery comprising:
  a plurality of cells each having a plurality of positive and negative electrode plates, the positive and negative electrode plates electrically isolated from one another by separators and having output lugs arranged alternately alongside one another;
  a first output lug bundle comprising the output lugs of the positive electrode plates of a first cell electrically connected together;
  a second output lug bundle comprising the output lugs of the negative electrode plates of the first cell electrically connected together;
  wherein the first output lug bundle and the second output lug bundle each comprise a recess for holding a respective pole output conductor;
  wherein each of the pole output conductors comprises an angled contact plate;
  wherein each of the contact plates comprises a first limb which forms a clamping plate with a hole for holding a clamping screw;
  wherein each of the contact plates also comprises a second limb which extends substantially at a right angle to the first limb;
  wherein the second limbs of the contact plates of adjacent cells are integrally formed with a cell connector element which connects the second limbs of adjacent cells to one another in order to conductively connect the adjacent cells to one another.

9. The rechargeable battery of claim 8 wherein the pole output conductor further comprises a second clamping plate at an end of the clamping screw opposite the first clamping plate.

10. The rechargeable battery of claim 9 wherein the second clamping plate abuts a bottom of the second limb such that the second limb acts as a guide for the second clamping plate.

11. The rechargeable battery of claim 8 wherein the second limb is integrally connected to a pole bolt which projects substantially at a right angle from the second limb.

12. The rechargeable battery of claim 8 wherein the first clamping plate and the second clamping plate form a clamping shoe wherein the first clamping plate and the second clamping plate move relative to one another by rotation of the clamping screw.

13. The rechargeable battery of claim wherein the recess is a slot-like recess with a U-shaped contour.

14. A rechargeable battery comprising:
  a plurality of cells each having a plurality of positive and negative electrode plates having output lugs arranged alternately alongside one another;
  a first output lug bundle comprising the output lugs of the positive electrode plates of a first cell electrically connected together;
  a second output lug bundle comprising the output lugs of the negative electrode plates of the first cell electrically connected together;
  wherein the first output lug bundle and the second output lug bundle each comprise a recess for receiving a respective pole output conductor;
  wherein each of the pole output conductors comprises a member having a first limb and a second limb extending substantially at a right angle to the first limb, the first limb forming a first clamping plate;
  wherein each of the pole output conductors further comprises a clamping screw and a second clamping plate at an end of the clamping screw opposite the first clamping plate such that the second clamping plate abuts a bottom of the second limb such that the second limb acts as a guide for the second clamping plate.

15. The rechargeable battery of claim 14 wherein the clamping screw is received in the recess of the respective output lug bundle.

16. The rechargeable battery of claim 15 wherein the recess is a slot-like recess with a U-shaped contour.

17. The rechargeable battery of claim 14 wherein the first clamping plate and the second clamping plate form a clamping shoe wherein the first clamping plate and the second clamping plate move relative to one another by rotation of the clamping screw.

18. The rechargeable battery of claim 14 wherein the second limb is integrally connected to a pole bolt which projects substantially at a right angle from the second limb.

19. The rechargeable battery of claim 14 wherein the second limb is integrally connected to a cell connector element which extends transversely away from the second limb.

20. The rechargeable battery of claim 19 wherein the cell connector element extends between adjacent cells, the cell connector element configured to conductively connect the adjacent cells to one another.

* * * * *

UNITED STATES PATENT AND TRADEMARK OFFICE
CERTIFICATE OF CORRECTION

PATENT NO. : 7,608,360 B2  Page 1 of 1
APPLICATION NO. : 11/019085
DATED : October 27, 2009
INVENTOR(S) : Wiepen It is certified that error appears in the above-identified patent and that said Letters Patent is hereby corrected as shown below:

Column 8:
line 6, replace "claim" with --claim 8--.

Signed and Sealed this

Second Day of February, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,608,360 B2 | Page 1 of 1 |
| APPLICATION NO. | : 11/019085 | |
| DATED | : October 27, 2009 | |
| INVENTOR(S) | : Wiepen | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by 690 days.

Delete the phrase "by 690 days" and insert -- by 1025 days --

Signed and Sealed this

Twenty-second Day of June, 2010

David J. Kappos
*Director of the United States Patent and Trademark Office*